Patented Sept. 22, 1936

2,055,280

UNITED STATES PATENT OFFICE 2,055,280

THERMOSTAT

Edward Dodson, Streatham, London, England

Application April 25, 1935, Serial No. 18,231
In Great Britain November 19, 1934

1 Claim. (Cl. 297—3)

It has been proposed to provide a thermostat with a rigid heat absorbing hollow body communicating at its bottom by a conduit to an expansible and collapsible container, all being filled with suitable oil or other liquid. In this proposal, however, the liquid had a high temperature coefficient of expansion and the expansion of the liquid itself was used to operate the said container.

The invention has for its object to provide a temperature responsive device of great power but in which excessive pressure in the said device is avoided.

According to this invention the thermostat comprises a boiler, a liquid-tight expansible and collapsible container, a conduit at the bottom of said boiler communicating with said expansible and collapsible container, all being filled, when the said container is in its collapsed condition, with a liquid adapted to vaporize at a predetermined temperature so that the vapour gradually drives the remainder of the liquid out of the boiler as the temperature increases.

The thermostat according to this invention is so arranged that the liquid content of the boiler is equal to the difference in capacity of the collapsible and expansible container between its collapsed condition and its expanded condition.

With this arrangement, on heating the boiler, vapour is generated at the top of the boiler and the liquid is forced out through the bottom, and a limit is reached when the whole boiler is filled with vapour, beyond which no further expansion of the container will take place. Thus the generation of excessive pressure in the thermostat is avoided. The thermostat will not be affected to any appreciable extent by thermal expansion of the liquid before vaporization of the liquid commences or by expansion of the vapour in the boiler after all the liquid has been driven out. Its effect on the apparatus which it is to control is, therefore, confined to the range between the temperature at which all the liquid begins to vaporize and the temperature at which all the liquid has been driven out of the boiler.

A further object of the present invention is to prevent the thermostat from being affected by external pressure differences as, for instance, when fitted to an aeroplane flying at different altitudes without affecting its functioning in accordance with the temperature difference at the source.

This further object is achieved by connecting an exhausted capsule or other pressure sensitive device (hereinafter referred to as a capsule) to the bellows in such a manner that this capsule compensates for the changes in external pressure on the bellows.

If the liquid to be used in the boiler and bellows is ether or the like, a spring or other loading device acting to extend the bellows may be required in order to reduce the boiling point of the liquid to the required temperature at normal ground atmospheric pressure. With decrease in external pressure at higher altitudes, the temperature at which the liquid will boil in the boiler will be lower. To reduce the boiling point of the liquid to the required temperature at ground level and to compensate for this decrease in pressure with increase in altitude, the exhausted capsule is so arranged that at ground level it applies a pull on the bellows and, if the bellows and capsule are identical, then as the external pressure decreases, the pressure on the liquid in the bellows will not vary because the relief of the air pressure load on these bellows will be balanced by a proportionate decrease of the pull of the capsule due to its extension.

Further, by providing means for varying the mechanical advantage of the pull of the capsule on the bellows, manufacturing discrepancies in the bellows and the capsule can be compensated for, and the boiling point of the liquid can be changed with change in altitude in a predetermined manner.

Both the temperature at which the bellows will commence to expand and the rate at which they expand, can be varied by putting them under an initial spring load with springs of varying strength, or the spring may operate through a toggle lever or cam, so as to vary, as requisite, the temperature-expansion curve of the bellows: In this connection it should be remembered that high pressure raises the boiling point of a liquid, and consequently controls the temperature at which the last of the liquid will be expelled from the boiler.

In cases where the thermostat is to be compensated for external pressure differences there is superposed above the bellows the compensating capsule. The bellows and compensating capsule are contained in a casing, the former being fixed at its lower end to the casing and the latter being connected at its upper end to a ball joint in the top of the casing. At its lower end the capsule is connected by a pin and slot connection to the lever which permits the point of connection to be adjusted towards and away from the fulcrum of the lever. Thus the ball joint and the pin and slot connection permit the mechanical advantage of the capsule to be varied relatively to that of the bellows.

Further, adjustment of the pull of the capsule on the bellows is provided by connecting the top of the capsule to the ball joint by means of a screw and providing a lock nut for locking the screw in any adjusted position relatively to the ball of the ball joint.

With this form of apparatus the exhausted capsule compensates for the change in pressure with increase or decrease of altitude, while the capsule may be arranged so that at ground level it is either in tension to apply a pull on the bellows for the purpose of reducing the boiling point of the liquid, or in compression to apply a pressure on the bellows to raise the boiling point of the liquid.

It will be obvious that the thermostat according to this invention has many applications. For instance, it can be used to operate a strangler shutter on a carburetter on a motor car for starting up when cold, so as automatically to enrich the mixture under such conditions. The starting shutter, according to British Patent No. 388,193, may conveniently be controlled by a thermostat in this way, and it can also be arranged that the throttle is partly forced open by the same operation.

Another use is in connection with the cylinders of an internal combustion engine, and it can be arranged that when the cylinder gets too hot, expansion of the bellows will cause enrichment of the mixture, or decrease the power, either by very much retarding the ignition timing, partly closing the carburetter throttle, or both, or the bellows can be made to operate heat-controlling means associated with the carburetter system.

The invention can also advantageously be used to control radiator shutters, so as to cause them to shut whenever the exhaust pipe of the motor cools off. Preferably another thermostat may be arranged to open the shutters when the water for cooling the engine has reached a predetermined temperature. The advantage of the double thermostatic control is that owing to the exhaust pipe losing heat faster than the water, the thermostat controlled by exhaust heat will close the radiator shutters again before the water has lost much heat.

The invention can be applied to engines having a boost control, in such a way as to operate an over-ride on the boost control to diminish the power output if the engine is overheating.

The invention will now be described by way of example with reference to the forms of construction shown in the accompanying drawings in which—

Figure 1:
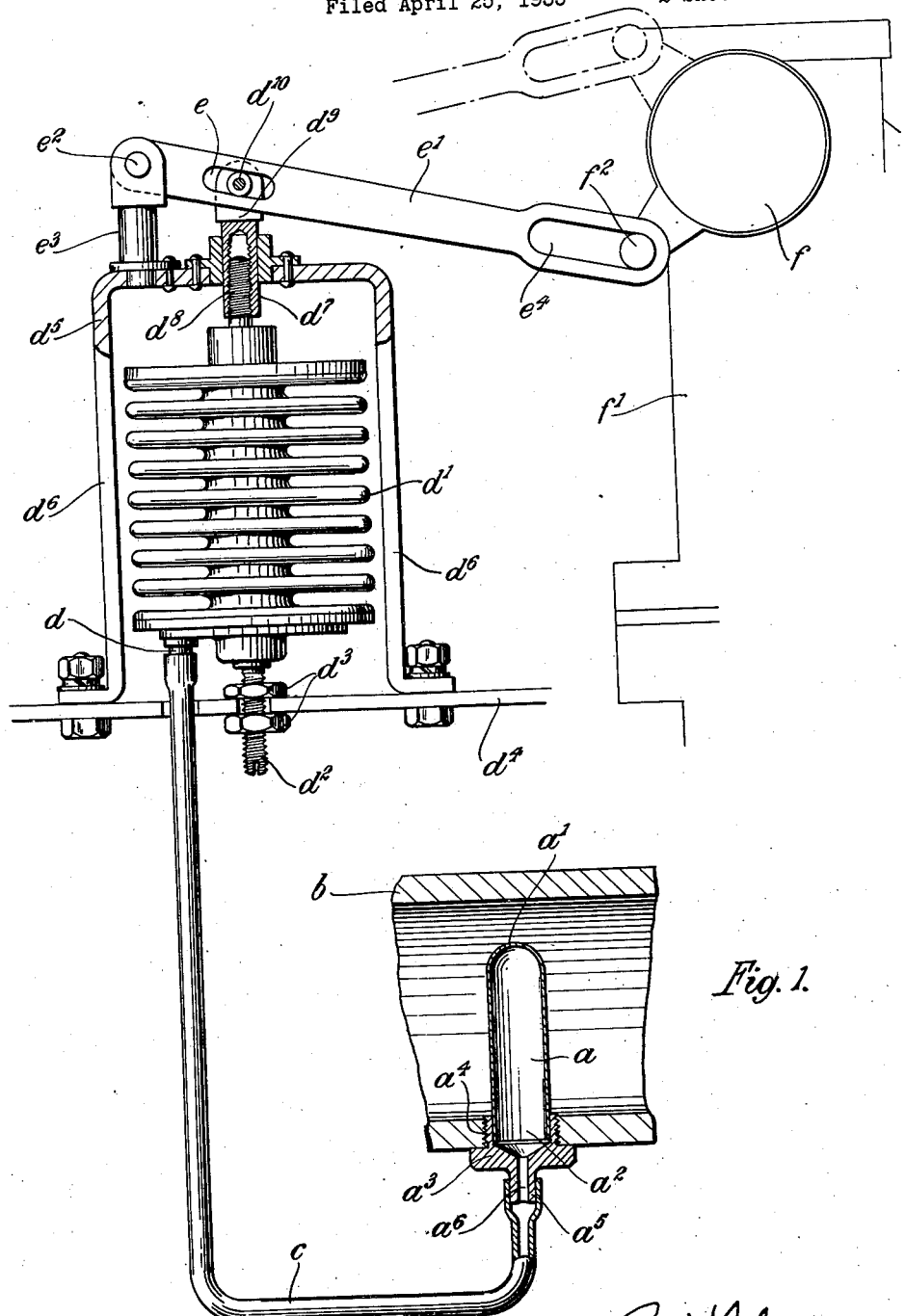
Fig. 1 is an elevation partly in section of a thermostat according to this invention shown as applied to the control of a strangler shutter on a carburetter of a motor car.

In Fig. 1 the boiler of the thermostat comprises a cylinder $a$ having a closed end $a^1$ and an open end $a^2$ and a nut $a^3$ securely fixed to the open end of the cylinder $a$ and having a reduced threaded portion $a^4$ which screws into the exhaust manifold $b$ of the internal combustion engine. The nut $a^3$ is provided with an extension $a^5$ and a passage $a^6$. The boiler is so arranged as shown that the cylindrical portion $a$ extends upwardly in the exhaust manifold while the passage $a^6$ extends downwardly and is in communication with the interior of the cylindrical portion.

The conduit $c$ is fixed at one end on to the projection $a^5$ and at its other end this conduit is securely fixed to a projection $d$ on a bellows device $d^1$ so that the conduit $c$ communicates the cylinder $a$ with the bellows device $d^1$. The bellows device consists of a series of superposed capsules interconnected and communicating with each other and so arranged as to form an expansible container. The bellows device is adjustably fixed by means of the screw $d^2$ and the nuts $d^3$ to a flange $d^4$ on the engine. This flange also carries a cupped member $d^5$ for containing the bellows device, the cupped member having side slots $d^6$ so as to expose the exterior of the bellows device to atmospheric pressure. The upper end of the cupped member carries and guides a slide $d^7$ which is adjustably screwed on to a threaded spindle $d^8$ projecting upwards from the bellows device so that the relation between the slide and the bellows device can be adjusted. This slide $d^7$ is formed with bifurcated portion $d^9$ having a pin $d^{10}$ which passes through a slot $e$ in the operating lever $e^1$ of an operating member $f$ of the carburetter $f^1$ for a strangler shutter. The lever $e^1$ is fulcrumed at $e^2$ on a support $e^3$ fixed to the cupped member and this lever is formed at its free end with a slot $e^4$ in which engages a crank $f^2$ on the strangler shutter $f$.

When the strangler shutter is closed as shown in Fig. 1 the friction load on the engine due partly to the oil being cool and sticky is so high that although the engine may fire, the force developed by the explosions when the throttle is nearly closed for idling is insufficient to enable the engine to continue to run against the friction load. This is prevented by providing the expansible container with means for partially forcing the throttle open when said shutter is closed. The usual bimetallic thermostat has insufficient power to operate the throttle against its spring but the thermostat according to this invention has ample power for this purpose.

Figure 2:
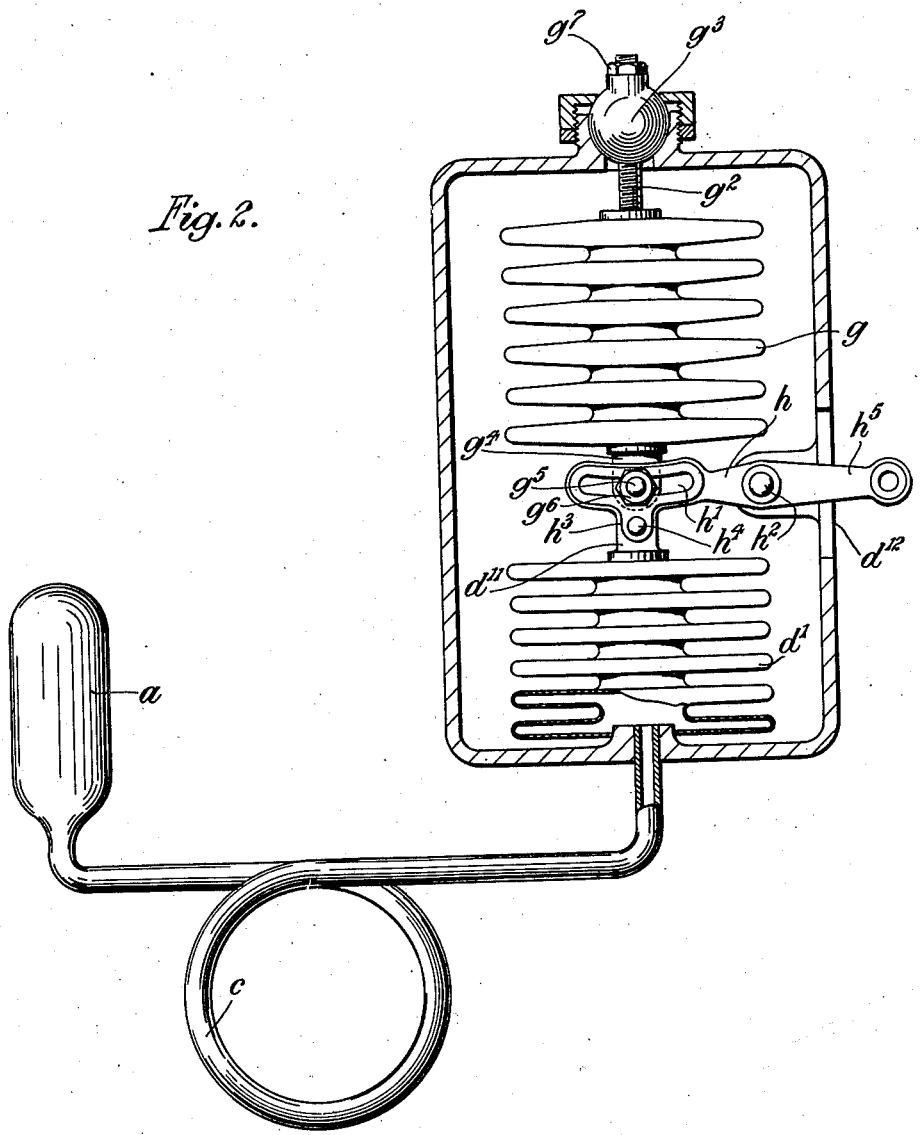
Fig. 2 is an elevation partly in section of a thermostat according to this invention with means for compensating for variation in pressure due to change in altitude.

In Fig. 2 which illustrates a thermostat suitable for use in controlling thermostatically different devices, the thermostat itself is constructed similar to that shown in Fig. 1, and like parts are indicated by like references in these different views. In Fig. 2, however, the cupped member carrying the bellows device $d^1$ also carries an exhausted capsule $g$ which is superposed above the bellows device $d^1$. This exhausted capsule is adjustably attached by means of the screw $g^2$ to a ball joint $g^3$ on the upper end of the cupped member, and at its lower end the capsule $g$ is connected by means of a lug $g^4$ and a pin $g^5$ to one arm of a lever $h$. Said arm of the lever $h$ is provided with an arcuate slot $h^1$ concentric with the centre of the ball joint $g^3$ and so arranged that by moving the pin $g^5$ in the slot towards or away from the fulcrum $h^2$ of the lever $h$ and fixing this in the required adjusted position by the nut $g^6$ the mechanical advantage of the pull exerted by the exhausted capsule $g$ can be varied and thus compensate for manufacturing discrepancies in the capsule and in the bellows.

The end of the lever $h$ to which the exhausted capsule is connected is provided with a depending lug $h^3$ carrying the pivot $h^4$ for a lug $d^{11}$ fixed on the upper end of the bellows device $d^1$.

The exhausted capsule acts to push or to pull the bellows device according to the setting of this capsule and the amount of push or pull of the capsule on the bellows can be adjusted by means of the screw $g^2$ and the ball joint $g^3$. A lock nut $g^7$ is provided on the screw $g^2$ for locking the screw in any adjusted position relatively to the ball joint.

The free end $h^5$ of the lever extends through an opening $d^{12}$ in the cupped member and can be connected to the device which is to be operated thermostatically. In conclusion it will be seen that the present invention offers a ready means, responsive only to the temperature of the source, for transmitting the power that is generated at the source of heat, and causing it to do necessary work at a distance at the time when the heat conditions call for this work to be done.

What I claim as my invention and desire to secure by Letters Patent is:—

A thermostat comprising, in combination, a liquid-tight vessel, a liquid-tight expansible container fixed at its one end and free at its other end, a conduit communicating said vessel with said expansible container, an exhausted capsule adjustably fixed in a universal joint at its one end and free to extend and swing about the universal joint at its other end, and a lever having one of its arms pivoted to the free end of said expansible container and adjustably connected by a pin and slot connection to the free end of said capsule.

EDWARD DODSON.